(12) United States Patent
Anderfaas et al.

(10) Patent No.: US 9,273,748 B2
(45) Date of Patent: Mar. 1, 2016

(54) MAGNETORHEOLOGICAL DAMPER SYSTEM

(71) Applicant: MillenWorks, Tustin, CA (US)

(72) Inventors: Eric N. Anderfaas, Westminster, CA (US); Dean Banks, Costa Mesa, CA (US)

(73) Assignee: MillenWorks, Tustin, CA (US)

( * ) Notice: Subject to any disclaimer, the term of this patent is extended or adjusted under 35 U.S.C. 154(b) by 218 days.

(21) Appl. No.: 13/847,995

(22) Filed: Mar. 20, 2013

(65) Prior Publication Data

US 2014/0138195 A1    May 22, 2014

Related U.S. Application Data

(63) Continuation of application No. 12/578,483, filed on Oct. 13, 2009, now Pat. No. 8,413,773, which is a continuation of application No. 11/767,421, filed on Jun. 22, 2007, now Pat. No. 7,600,616, which is a (Continued)

(51) Int. Cl.
*F16F 9/53* (2006.01)

(52) U.S. Cl.
CPC ..................................... *F16F 9/535* (2013.01)

(58) Field of Classification Search
CPC .......... F16F 9/535; F16F 9/537; G05D 19/02; B60G 2400/252; B60G 2400/25
USPC ............................ 188/267.2, 267, 267.1, 276; 267/140.14, 140.15; 701/37; 323/282, 323/288, 351
See application file for complete search history.

(56) References Cited

U.S. PATENT DOCUMENTS

| 2,846,028 | A | 3/1955 | Gunther |
| 2,940,749 | A | 6/1960 | Kemelhor |
| 3,754,541 | A | 8/1973 | Sasayama |
| 4,351,515 | A | 9/1982 | Yoshida |
| 4,479,161 | A | 10/1984 | Henrich et al. |

(Continued)

FOREIGN PATENT DOCUMENTS

| DE | 3443183 A1 | 5/1986 |
| DE | 10131799 A1 | 1/2003 |

(Continued)

OTHER PUBLICATIONS

United States Patent and Trademark Office, Notice of Allowance mailed Dec. 19, 2012 in U.S. Appl. No. 12/578,483, 7 pages.

(Continued)

*Primary Examiner* — Pamela Rodriguez
(74) *Attorney, Agent, or Firm* — Inskeep IP Group, Inc.

(57) ABSTRACT

A magnetorheological damper system comprising a reservoir in communication with a damper. The damper comprises a damper cylinder defining a damper chamber, wherein the damper chamber contains a magnetorheological fluid and a movable damper piston. The damper piston comprises at least two coil windings on the outer surface of the damper piston, wherein the damper piston is capable of generating a magnetic field between the damper piston and a wall of the damper cylinder. The reservoir comprises a reservoir cylinder defining a passageway, wherein the reservoir includes a magnetorheological electromagnet capable of generating a magnetic field between the magnetorheological piston and a wall of the passageway. The combination of the MR reservoir and MR damper leads to a damping system capable of damping a wide range of extreme forces.

20 Claims, 12 Drawing Sheets

Related U.S. Application Data continuation of application No. 11/207,376, filed on Aug. 18, 2005, now Pat. No. 7,234,575, which is a continuation of application No. 10/406,922, filed on Apr. 4, 2003, now Pat. No. 6,953,108.

(56) References Cited

U.S. PATENT DOCUMENTS

| | | | |
|---|---|---|---|
| 4,774,624 A | 9/1988 | Qualich | |
| 4,858,733 A | 8/1989 | Noguchi et al. | |
| 4,869,476 A | 9/1989 | Shtarkman | |
| 4,950,974 A | 8/1990 | Pagano | |
| 5,052,662 A | 10/1991 | Doi | |
| 5,056,496 A | 10/1991 | Morino et al. | |
| 5,142,171 A | 8/1992 | Nunogawa et al. | |
| 5,176,368 A | 1/1993 | Shtarkman | |
| 5,179,508 A | 1/1993 | Lange et al. | |
| 5,234,575 A | 8/1993 | Haag et al. | |
| 5,284,330 A | 2/1994 | Carlson et al. | |
| 5,316,112 A | 5/1994 | Kimura et al. | |
| 5,329,416 A | 7/1994 | Ushiyama et al. | |
| 5,396,973 A | 3/1995 | Schwemmer et al. | |
| 5,398,917 A | 3/1995 | Carlson et al. | |
| 5,515,261 A | 5/1996 | Bogdan | |
| 5,523,676 A | 6/1996 | Bach et al. | |
| 5,563,781 A | 10/1996 | Clauter et al. | |
| 5,582,385 A | 12/1996 | Boyle et al. | |
| 5,589,746 A | 12/1996 | Lewis | |
| 5,760,571 A | 6/1998 | Latham, II et al. | |
| 5,925,990 A | 7/1999 | Crouse et al. | |
| 5,956,951 A | 9/1999 | O'Callaghan | |
| 5,979,412 A | 11/1999 | Werner | |
| 5,982,604 A | 11/1999 | Kojima et al. | |
| 6,019,201 A | 2/2000 | Gordaninejad et al. | |
| 6,031,707 A | 2/2000 | Meyer | |
| 6,131,709 A | 10/2000 | Jolly et al. | |
| 6,151,930 A | 11/2000 | Carlson | |
| 6,181,079 B1 | 1/2001 | Chang et al. | |
| 6,279,702 B1 | 8/2001 | Koh | |
| 6,311,810 B1 | 11/2001 | Hopkins et al. | |
| 6,390,253 B1 | 5/2002 | Oliver | |
| 6,407,593 B1 | 6/2002 | Kawamoto et al. | |
| 6,419,057 B1 | 7/2002 | Oliver et al. | |
| 6,427,813 B1 | 8/2002 | Carlson | |
| 6,459,602 B1 | 10/2002 | Lipcsei | |
| 6,460,662 B2 | 10/2002 | Niaura et al. | |
| 6,472,598 B1 | 10/2002 | Glenn | |
| 6,474,598 B2 | 11/2002 | Carter, Jr. | |
| 6,510,929 B1 | 1/2003 | Gordaninejad et al. | |
| 6,547,043 B2 | 4/2003 | Card | |
| 6,577,488 B1 | 6/2003 | Seifert et al. | |
| 6,631,067 B2 | 10/2003 | Newton et al. | |
| 6,675,784 B2 | 1/2004 | Nagase et al. | |
| 6,752,250 B2 | 6/2004 | Tanner | |
| 6,781,352 B2 | 8/2004 | Athari et al. | |
| 6,856,100 B1 | 2/2005 | Konopka | |
| 6,892,864 B2 | 5/2005 | Iyengar et al. | |
| 6,948,707 B2 | 9/2005 | Gradu | |
| 6,953,108 B2 | 10/2005 | Anderfaas et al. | |
| 7,057,870 B2 | 6/2006 | Meyer et al. | |
| 7,075,254 B2 | 7/2006 | Chitta et al. | |
| 7,098,605 B2 | 8/2006 | Oh | |
| 7,116,063 B2 | 10/2006 | Ohnishi et al. | |
| 7,234,575 B2 | 6/2007 | Anderfaas et al. | |
| 7,274,116 B2 | 9/2007 | Inoue et al. | |
| 7,275,750 B2 | 10/2007 | Suchta et al. | |
| 7,278,522 B2 | 10/2007 | Reinhardt et al. | |
| 7,364,022 B2 | 4/2008 | Gordaninejad et al. | |
| 7,423,386 B2 | 9/2008 | Radzinski et al. | |
| 7,457,140 B2 | 11/2008 | Klein | |
| 7,600,616 B2 | 10/2009 | Anderfaas et al. | |
| 7,725,750 B2 | 5/2010 | Ashish et al. | |
| 8,413,773 B2 * | 4/2013 | Anderfaas et al. | 188/267.2 |
| 2003/0057618 A1 | 3/2003 | Tanner | |
| 2003/0070892 A1 | 4/2003 | Iyengar et al. | |
| 2003/0195683 A1 | 10/2003 | Oakley et al. | |
| 2004/0173422 A1 | 9/2004 | Deshmukh et al. | |
| 2005/0121841 A1 | 6/2005 | Gradu | |
| 2006/0021607 A1 | 2/2006 | Toriyama | |
| 2006/0274468 A1 | 12/2006 | Phadke | |

FOREIGN PATENT DOCUMENTS

| | | |
|---|---|---|
| DE | 10319406 A1 | 10/2004 |
| EP | 0261427 A2 | 8/1987 |
| EP | 0335016 A1 | 10/1989 |
| EP | 1355083 A2 | 10/2003 |
| GB | 2111171 A | 6/1983 |
| GB | 2267947 A | 12/1993 |
| JP | 55-112440 A | 8/1980 |
| JP | 04-258542 A | 9/1992 |
| JP | 06-17871 A | 1/1994 |
| JP | 08-189542 A | 7/1996 |
| JP | 08-247203 A | 9/1996 |
| JP | 2001-165229 A | 6/2001 |
| JP | 2002-168283 A | 6/2002 |
| JP | 2005-054846 A | 3/2005 |
| JP | 2005-054847 A | 3/2005 |
| JP | 2007-32582 A | 2/2007 |

OTHER PUBLICATIONS

United States Patent and Trademark Office, Final Office Action mailed Sep. 11, 2012 in U.S. Appl. No. 12/578,483, 12 pages.
United States Patent and Trademark Office, Office Action mailed Apr. 5, 2012 in U.S. Appl. No. 12/578,483, 10 pages.
United States Patent and Trademark Office, Notice of Allowance mailed Jun. 4, 2009 in U.S. Appl. No. 11/767,421, 7 pages.
United States Patent and Trademark Office, Office Action mailed Nov. 21, 2008 in U.S. Appl. No. 11/767,421, 10 pages.
United States Patent and Trademark Office, Notice of Allowance mailed Feb. 27, 2007 in U.S. Appl. No. 11/207,376, 6 pages.
United States Patent and Trademark Office, Final Office Action mailed Jun. 23, 2006 in U.S. Appl. No. 11/207,376, 13 pages.
United States Patent and Trademark Office, Office Action mailed Feb. 6, 2006 in U.S. Appl. No. 11/207,376, 10 pages.
Automotive Handbook, 1996, Robert Bosch GmbH, 4th Edition, pp. 170-173.

* cited by examiner

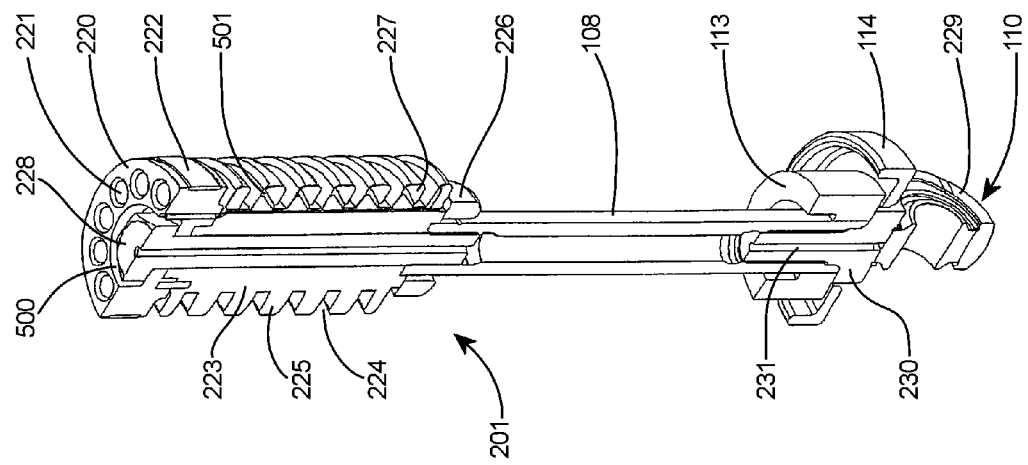
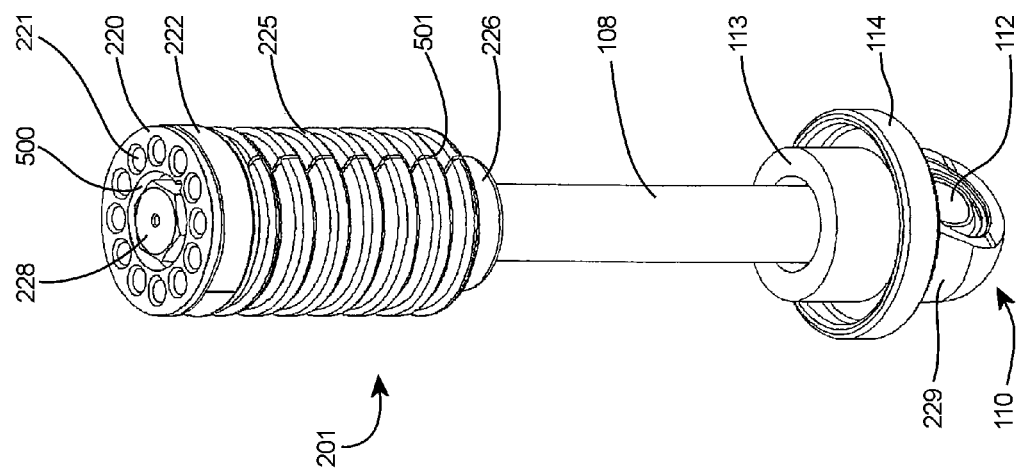

MAGNETORHEOLOGICAL DAMPER SYSTEM

RELATED APPLICATIONS

This application is a continuation of and claims priority to U.S. patent application Ser. No. 12/578,483, filed Oct. 13, 2009, entitled Magnetorheological Damper System(now U.S. Pat. No. 8,413,773 issued Apr. 9, 2013), which is a continuation of U.S. patent application Ser. No. 11/767,421 filed Jun. 22, 2007 entitled Magnetorheological Damper System (now U.S. Pat. No. 7,600,616 issued Oct. 13, 2009), which is a continuation of U.S. patent application Ser. No. 11/207,376 filed Aug. 18, 2005 entitled Magnetorheological Damper System (now U.S. Pat. No. 7,234,575 issued Jun. 26, 2007), which is a continuation of U.S. patent application Ser. No. 10/406,922 filed Apr. 4, 2003 entitled Magnetorheological Damper System (now U.S. Pat. No. 6,953,108 issued Oct. 11, 2005), all of which are hereby incorporated herein by reference in their entireties.

REFERENCE TO GOVERNMENT

This invention was made with Government support under Contract Nos. DAAE07-00-C-L010 and DAAE07-01-C-L018 awarded by the United States Army. The Government has certain rights in this invention.

BACKGROUND OF THE INVENTION

One of the persistent design constraints in the field of engineering is vibration and/or force impact and/or fatigue management. That is, nearly all engineered devices and systems must embody a design that is sufficiently robust so as to safely survive all movement, vibration, impact, etc. that such a device or system is likely to encounter in its useful life. Examples of such areas of engineered devices and systems are seismic protection devices, construction hardware, seating systems in vehicles such as helicopters, boats, etc., manufacturing equipment and the like, all of which relate to the present invention as will be self-evident from the text below that describes in detail various preferred embodiments.

Such design constraints, however, are no more self evident than in the field of vehicle design. It is well understood that vehicles endure a constant barrage of forces, impacts and vibrations throughout a vehicle's entire useful life. Indeed, when it comes to vehicle design, it may be said that this adverse active environment is perhaps the primary design constraint.

The common and long known methodology for meeting these rigorous design constraints of vehicle design is the use of a spring and damper system located at appropriate locations along the vehicle chassis, most commonly between each tire/wheel assembly and the vehicle frame. The most common type of spring and damper system in this regard is the conventional shock absorber.

Conventional shock absorbers are comprised of two reciprocating cylindrical tubes that extend, via an intervening spring, from the tire/wheel of the vehicle to the vehicle frame. One cylindrical tube is filled with fluid and the other cylindrical tube houses a piston that passes through the fluid when the tubes move relative to each other. When the piston moves, it forces the fluid through restrictive passages within the piston. This thereby controls the speed with which the two tubes can move relative to each other for a given force.

When a vehicle encounters a hole or a bump, the tire/wheel moves in response thereto and thereby tends to urge the spring to either extend or compress. If there was a spring alone (i.e., no cylindrical tubes discussed above) between the tire/wheel and the frame, there is a risk that this difficult terrain will cause the spring to resonate, a condition that adversely effects the handling and ride of the vehicle. The cylindrical tube structure, therefore, substantially inhibits such resonating because movement of the spring is dependent on movement of the two reciprocating tubes. That is, the added resistance to movement of the tubes due to the restrictive flow of fluid resulting from movement of the piston thereby dampens the forces that would otherwise cause the spring to extend or compress. This, in turn, substantially inhibits spring resonance and ensures proper handling and ride of the vehicle.

A number of modifications to this basic shock absorber design have been made over the years in order to enhance the damping effect of the device. For example, changing the size of the restrictive passages in one of the tubes and/or using a fluid with a different viscosity can have material improved effects on the shock absorber performance. Performance characteristics can also be altered by increasing or decreasing the size of the shock, changing the design of the tubes, the internal valving (restrictive passages), etc.

There are, however, practical limits as to how much shock performance may be changed by making such alterations. As a result, alternative damping systems have been formulated.

One such alternative system is based on the utilization of a variable shear strength fluid such as a magnetorheological (MR) fluid. MR fluid based devices are founded on the principle of controlling the shear strength of the MR fluid by inducing and controlling a magnetic field around the piston. Control of this magnetic field can change the shear strength of the MR fluid anywhere from its normal state as a liquid to an energized state that is nearly a solid. Therefore, by precision control of the magnetic field, the shear strength of the MR fluid is adjusted so as to precisely control the damping performance of the device. An example of such an MR device is disclosed in U.S. Pat. No. 6,419,058 which is hereby incorporated by reference in its entirety.

Nonetheless, the demands placed on vehicles, particularly off-road vehicles (as well as other devices and systems that encounter a rugged environment), continues to increase, all with the corresponding demand to avoid any degradation in passenger comfort or endurance. As a result, there is now an expectation and need to provide a damping system that can withstand very sizable range of operating environments, namely, anywhere from a flat, obstruction free surface to the most difficult of off-road conditions. Indeed, the system must not only withstand such environments, but must operate effectively and continuously throughout this wide range of operating environments without degradation in performance.

In this regard, the principle of using MR fluid appears to be well suited to providing the accurate control necessary for the operating environment discussed above. However, the inventors are not aware of any prior art MR devices capable of correctly operating at very high damping forces and/or that support wide ranges of damping forces without the system either encountering undesired cavitation or without being severely damaged. Nor are the inventors aware of any prior art MR devices that have adequate bandwidth for effective isolation of the high frequency road inputs often encountered with difficult terrains.

OBJECTS AND SUMMARY OF THE INVENTION

Accordingly, it is an object of the present invention to provide a damping device that addresses the known deficiencies in the prior art.

It is a further object of the present invention to provide a damping device that operates correctly and efficiently at very high and very low damping forces.

It is a further object of the present invention to provide a damping device that supports wide ranges of damping forces.

It is a further object of the present invention to provide a damping device that has adequate bandwidth for effective isolation of the high frequency road inputs.

It is yet a further object of the present invention to provide a control system that effectively controls the damping device at very high and very low damping forces.

It is yet a further object of the present invention to propose an MR device that operates according to the aforesaid objectives.

It is yet a further object of the present invention to provide an MR device that can be used on vehicles, seismic damping devices and numerous other devices and systems that demand a damping system.

It is yet a further object of the present invention to propose an MR device that is relatively straightforward to manufacture and assemble.

These and other objects not specifically enumerated here are contemplated by the vibration damping system of the present invention which in one preferred embodiment may include a main housing having a magnetorheological damper valve movable within said main housing and a reservoir chamber having a magnetorheological electromagnet and wherein the main housing and said reservoir are in fluid communication with each other with a magnetorheological fluid. The system further includes a control system which includes a routine for energizing said magnetorheological damper valve in response to at least one sensed condition of said damping system so as to dampen forces exerted on said damping system. This routine includes a routine for also energizing said magnetorheological electromagnet in response to at least one sensed condition of said damping system so as to substantially prevent cavitation in said damping system over substantially the entire operating range of said damper system.

In another exemplary embodiment of the present invention, there is contemplated a method of damping forces that includes providing a magnetorheological (MR) damping system on a structure that encounters periodic external forces. The damping system has a movable electromagnet and a stationary electromagnet, both of which being in fluid communication with magnetorheological fluid. The system senses at least one external motion variable on said structure that causes movement of said movable electromagnet. The system then energizes at least said movable electromagnet in response to said sensed external force. The system will energize both said movable electromagnet and said stationary electromagnet when said sensed external motion variable exceeds a predetermined threshold amount such that cavitation of said damping system is substantially prevented in said damping system beyond said predetermined threshold.

BRIEF DESCRIPTION OF THE DRAWINGS

The aforesaid object ands and summary are now discussed with reference to specific exemplary embodiments of the present invention using the accompanying drawing figures in which:

FIG. 5 is a perspective view of an exemplary embodiment of a magnetorheological damper piston;

FIG. 6 is a cross-sectional perspective view of FIG. 5;

DETAILED DESCRIPTION OF THE INVENTION

Discussed below is a detailed description of various illustrated embodiments of the present invention. This description is not meant to be limiting but rather to illustrate the general principles of the present invention. It will be appreciated by the reader that the principles constituting the invention can be applied with great success to any number of applications that require management of shock forces, vibration, etc.

Figure 1:
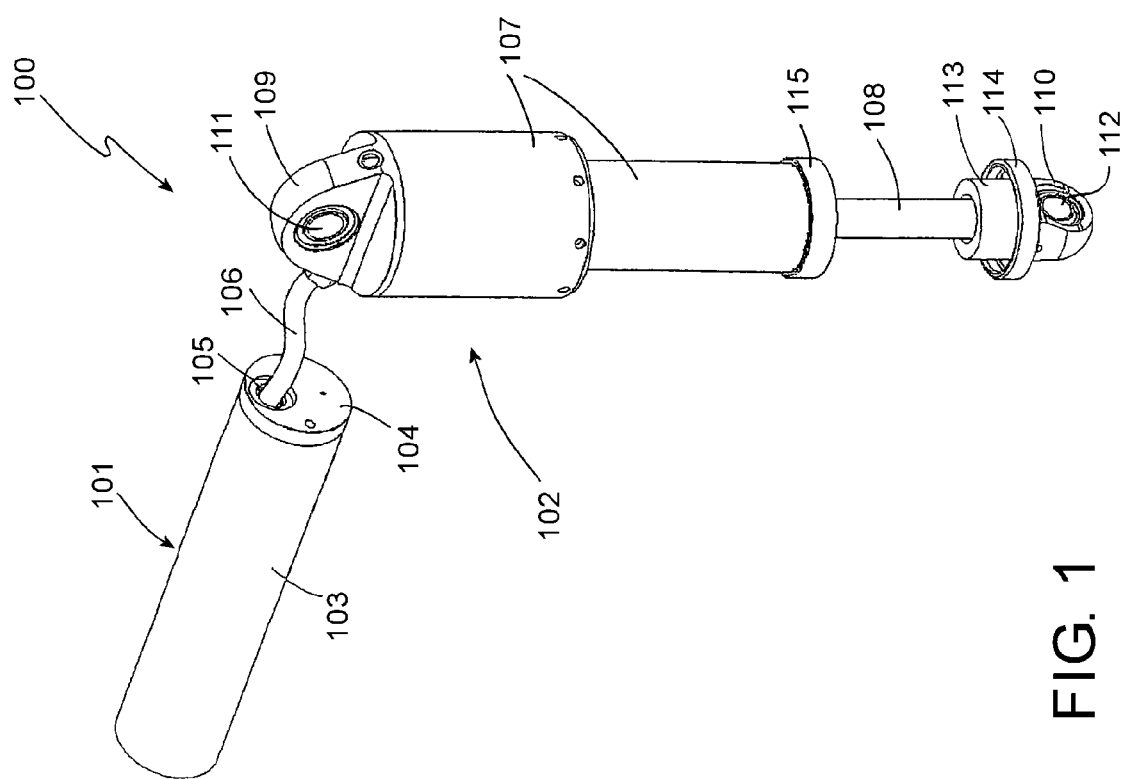
FIG. 1 is a perspective view of an exemplary embodiment of the magnetorheological damper system in accordance with the present invention.
Figure 4:
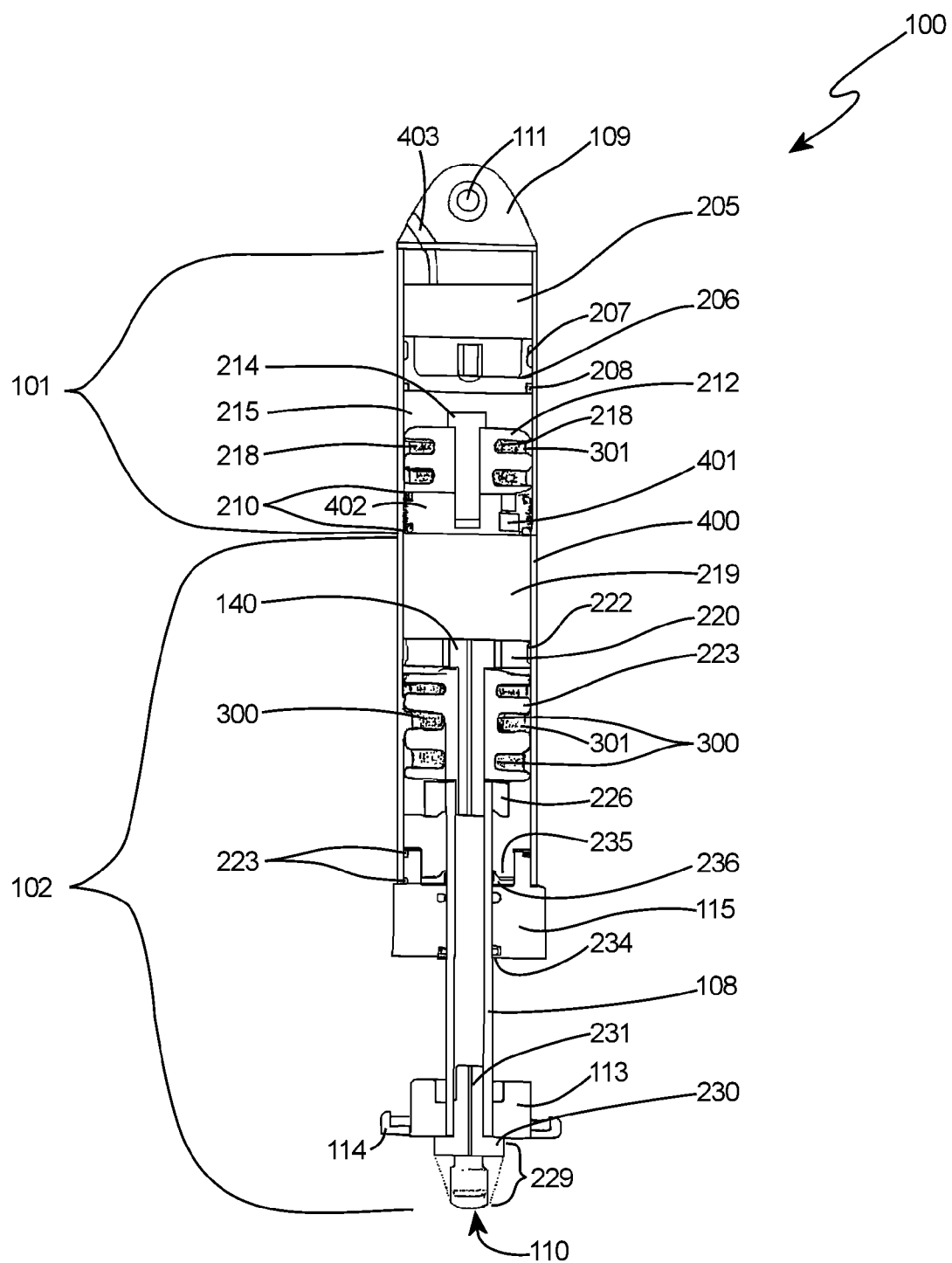
FIG. 4 is a cross-sectional view of another exemplary embodiment of the magnetorheological damper system in accordance with the present invention.

With reference to FIG. 1, an MR damper system 100 of the present invention is shown and includes a separate reservoir 101 component in communication with a MR damper 102. However, the reservoir 101 may be integral with the MR damper 102 as shown in FIG. 4 where the reservoir 101 is depicted as being contained within the same structure of the MR damper 102. As will be discussed in greater detail below, the reservoir 101 serves to store and return MR fluid (not shown) that has been displaced from the MR damper 102 during compression of the damper 102 and is particularly instrumental in achieving the objectives of the present invention.

Again referring to FIG. 1, reservoir 101 comprises a reservoir housing 103 having two opposite ends which are sealed by a reservoir gland 104 and an end cap (not shown), respectively. The reservoir gland 104 and the end cap (not shown) are secured to the reservoir housing 103 via threads on the inner diameter of the reservoir housing 103, however, the reservoir gland 104 and the end cap (not shown) can be friction fitted to the reservoir housing 103, or in certain circumstances, the end cap (not shown) can be integral with the reservoir housing 103 and the reservoir gland 104 can be coupled to the reservoir housing 103 in a friction-fit or screw-fit relation. It can also be coupled using cold forming of the reservoir housing 103 as well as by other methods known to one of ordinary skill in the art.

The reservoir gland 104 includes a through-hole 105 that receives a conduit 106 which can be steel-braided tubing. The conduit 106 fluidly connects the reservoir 101 to the MR damper 102. In an exemplary embodiment, conduit 106 is capable of handling at least 2000 psi of pressure, although in other embodiments, the conduit 106 is capable of handling at least 3000 psi of pressure. As those skilled in the art will appreciate, different types of tubing having varying pressure capabilities can also be used to place the reservoir 101 in fluid communication with the MR damper 102.

Continuing with reference to FIG. 1, the MR damper 102 includes a damper housing 107 and a telescoping damper rod 108. At the ends of the damper housing 107 and the damper rod 108 are a cylinder end 109 and a rod end 110, respectively. The cylinder end 109 and the rod end 110 have openings 111, 112 that provide attachment points for the MR damper 102 to a vehicle's chassis/body and suspension, respectively. As shown in FIG. 1, a bump stop 113, a bump stop cup 114, and rod end 110 are provided at a second end of the damper rod 108. The bump stop 113 and the bump stop cup 114 prevent damage to the damper housing 107 in the event that an especially harsh force causes damper rod 108 to become fully compressed.

The damper housing 107 of the MR damper 102 is sealed by a cylinder end 109 at a first end and a damper gland 115 at a second end of the damper housing 107 to define an internal chamber 219. The cylinder end 109 and the damper gland 115 may be coupled to the damper housing 107 by screw-fit or friction-fit. Alternatively, the cylinder 109 end is an integral member of the damper housing 107 or can be screwed onto the damper housing 107. In an exemplary embodiment, threads are located on both the cylinder end 109 and the damper housing 107 so as to facilitate the assembly and maintenance of the MR damper 102.

Figure 2:
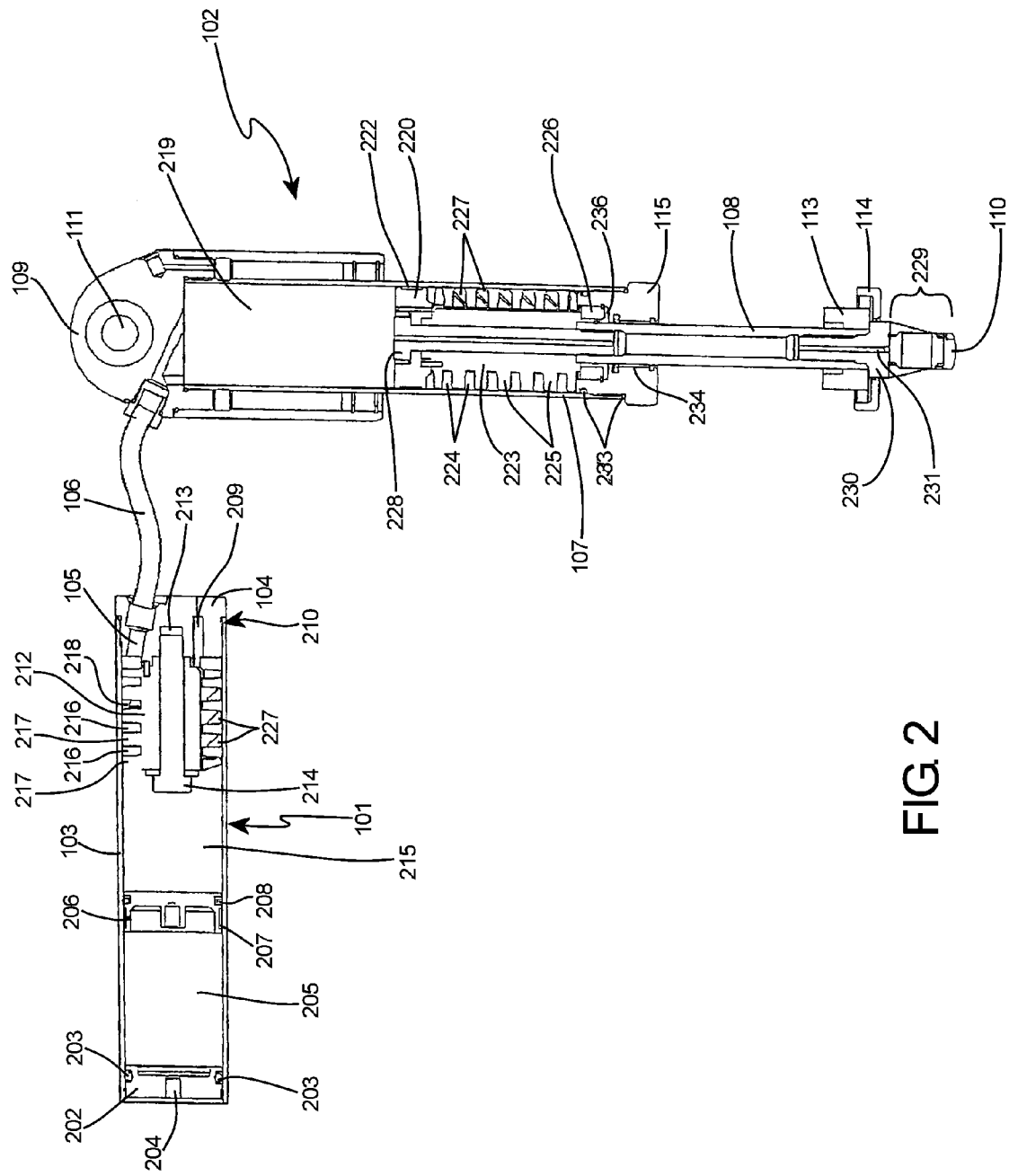
FIG. 2 is a cross-sectional view of FIG. 1.

Referring next to FIG. 2, the internal configuration of the reservoir 101 and the MR damper 102 is shown. In particular, the reservoir 101 comprises a reservoir housing 103 that defines an internal chamber 215 for holding a volume of MR fluid, preferably an amount equal to at least the volume of MR fluid that may be displaced by a fully compressed damper piston 201 of the MR damper 102. An end cap 202 seals one end of the reservoir housing 103, which may be secured to the reservoir housing 103 by a screw-fit, friction-fit, or may be integral with the reservoir housing 103, all of which has been discussed previously as to other similar components of the system. As shown in FIG. 2, a gasket, or "O" ring 203, which is positioned on the outer circumference of the end cap 202, seals the end cap 202 in the reservoir housing 103. The end cap 202 is also provided with a valve 204 which allows for the introduction of an inert gas such as nitrogen into the space 205 between the end cap 202 and a reservoir piston 206. The purpose of introducing such an inert gas is discussed further below.

With further reference to FIG. 2, the reservoir piston 206 is generally cylindrical and is movable within the reservoir housing 103. The reservoir piston 206 separates the inert gas from the MR fluid that may enter the reservoir 101 from the MR damper 102. The reservoir piston 206 is provided with two gaskets, 207, 208, to create a seal between the reservoir piston 206 and the walls of the reservoir housing 103.

The second end of the reservoir housing 103 is sealed with a reservoir gland 104. The reservoir gland 104 is a generally puck-shaped structure having a first face and a second face. The reservoir gland 104 also includes first through-hole 209 and a second through-hole 105. The reservoir gland 104 is also provided with a gasket 210 to create a seal between the reservoir gland 104 and the reservoir housing 103. The first through-hole 209 is provided to allow the wires (not shown) that comprise the coil windings 218 of the reservoir electromagnet 212 to exit the reservoir 101 and is typically doped with a sealing substance so as to sealingly retain the wire in place.

The second through-hole 105 allows MR fluid to either enter or exit the reservoir 101. The reservoir gland 104 also includes a recess 213 on the first face that is capable of receiving a bolt 214. The bolt 214 secures the reservoir electromagnet 212 to the reservoir gland 104. The recess 213 is positioned on the face of the reservoir gland 104 in order to center the reservoir electromagnet 212 within the internal space 215 of the reservoir 101, and thus concentrically within the cylindrical reservoir housing 103. That is, the reservoir electromagnet 212 is positioned within the reservoir 101 so as to ensure the existence of a substantially constant spacing between the outer circumference of the reservoir electromagnet 212 and the reservoir housing 103.

Figure 8:
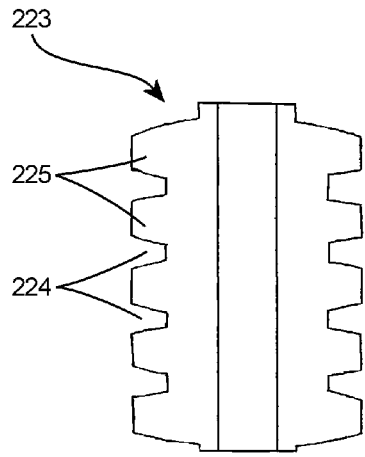
FIG. 8 is a side view of an another exemplary embodiment of a magnetorheological damper valve in accordance with the present invention.
Figure 9:
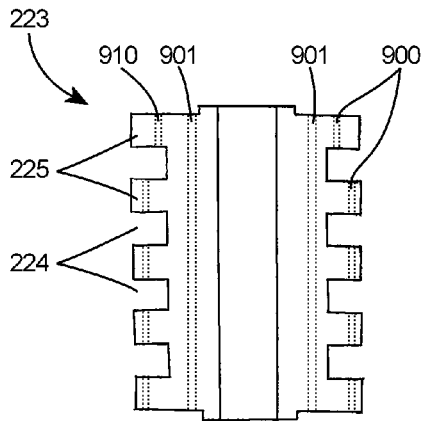
FIG. 9 is a side view of yet another exemplary embodiment of a magnetorheological damper valve in accordance with the present invention.

The reservoir electromagnet 212 is a generally cylindrical body having a centered through hole extending the length of the electromagnet 212. The reservoir electromagnet 212 also includes a plurality of annular recesses 216 provided on the outer diameter of the cylindrical body. Adjacent annular recesses define ribs 217 on the perimeter of the reservoir electromagnet 212. As illustrated in FIG. 2, the ribs 217 have radiused outer edges. Alternatively, as illustrated in FIG. 9, the ribs 217 may be substantially square. In yet another exemplary embodiment, as illustrated in FIG. 8, the ribs 217 of the reservoir electromagnet 212 may be tapered.

A wire (not shown) is coiled about each annular recess 216 to form coil windings 218. Adjacent coil windings 218 are wound in opposite directions (as indicated by the arrows in FIG. 5) to generate a magnetic flux emitted radially between adjacent ribs when a current is passed through the wire (not shown). In one exemplary embodiment, the reservoir electromagnet 212 comprises at least two coil windings 218. In the exemplary embodiments depicted in FIGS. 2-4, the reservoir electromagnet 212 includes four coil windings 218. As those skilled in the art will appreciate, the reservoir electromagnet 212 may have any number of coil windings 218 depending upon the desired magnetic field.

Figure 10:
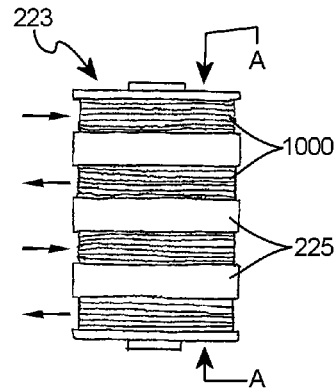
FIG. 10 is a side view of one embodiment of a magnetorheological damper valve in accordance with the present invention.

As shown in FIG. 10, the coil windings 218 are slightly recessed between the ribs 217 of the reservoir electromagnet 212. In an alternate embodiment, the circumference of the coil windings 218 and the walls of the reservoir electromagnet 212 may be substantially flush. The distance between the coil windings 218 and the wall of the reservoir housing 103 as well as the distance between the outermost portion of the reservoir electromagnet 212 and the wall of the reservoir housing 103 should be substantially equal in order to promote laminar flow of the MR fluid over the reservoir electromagnet 212.

In one exemplary embodiment, the wire (not shown) that forms the coil windings 218 is received in a small in-laid slot in each rib 217 so as to allow the wire to travel to the next adjacent recess 216. These in-laid slots are then filled with small piston gap plugs 227 to protect the wire (not shown) spanning between adjacent annular recesses 216. Alternatively, as shown in FIG. 9, the wire (not shown) may be directed into through-holes 900, 901 through the ribs 217 into each adjacent annular recess 216.

Turning now to the MR damper 102 itself, again with reference to FIG. 2, the MR damper 102 includes a damper housing 107 that defines an internal chamber 219. The internal chamber 219 houses a MR fluid and is bound by the cylinder end 109 and a damper gland 115. According to one exemplary embodiment, the MR fluid is a hydrocarbon-based fluid having micron-sized magnetizable particles suspended in the fluid. For example, in one exemplary embodiment, Lord Corporation MRF-122-2ED fluid may be utilized in the MR damper 102. In another exemplary embodiment, Lord Corporation MRF 132AD fluid may be utilized in the MR damper 102. As those skilled in the art will appreciate, any MR fluid known or developed in the art may be utilized in the MR damper 102 so long as the properties of the MR fluid are accounted for in the control algorithm for the MR damper systems 100.

A damper piston 201 is positioned within the internal chamber 219 of the MR damper 102 and includes piston end 220, a MR damper valve 223 coupled to a damper rod 108. The damper piston 201 is capable of moving within the internal chamber 219 along the longitudinal axis of the damper housing 107. With reference to FIGS. 5 and 6, the piston end 220 is a puck-shaped structure having a centered through-hole 500, and a plurality of openings 221 positioned about the circumference of the piston end 220.

The piston end 220 also includes a linear bushing 222 about the outer diameter of the piston end 220. The piston end 220 is sized to center the MR damper valve 223 within the bore of the damper housing 107. That is, the piston end 220 ensures that the distance between the MR damper valve 223 and the wall of the damper housing 107 is substantially constant about the circumference of the MR damper valve 223. According to one exemplary embodiment, the linear bushing 222 is made of steel. In another exemplary embodiment, the linear bushing 222 is made of Teflon®-impregnated steel. At those skilled in the art will appreciate, the linear bushing 222 may be made from a plurality of materials such as, but not limited to, aluminum, stainless steel, and titanium.

Figure 3:
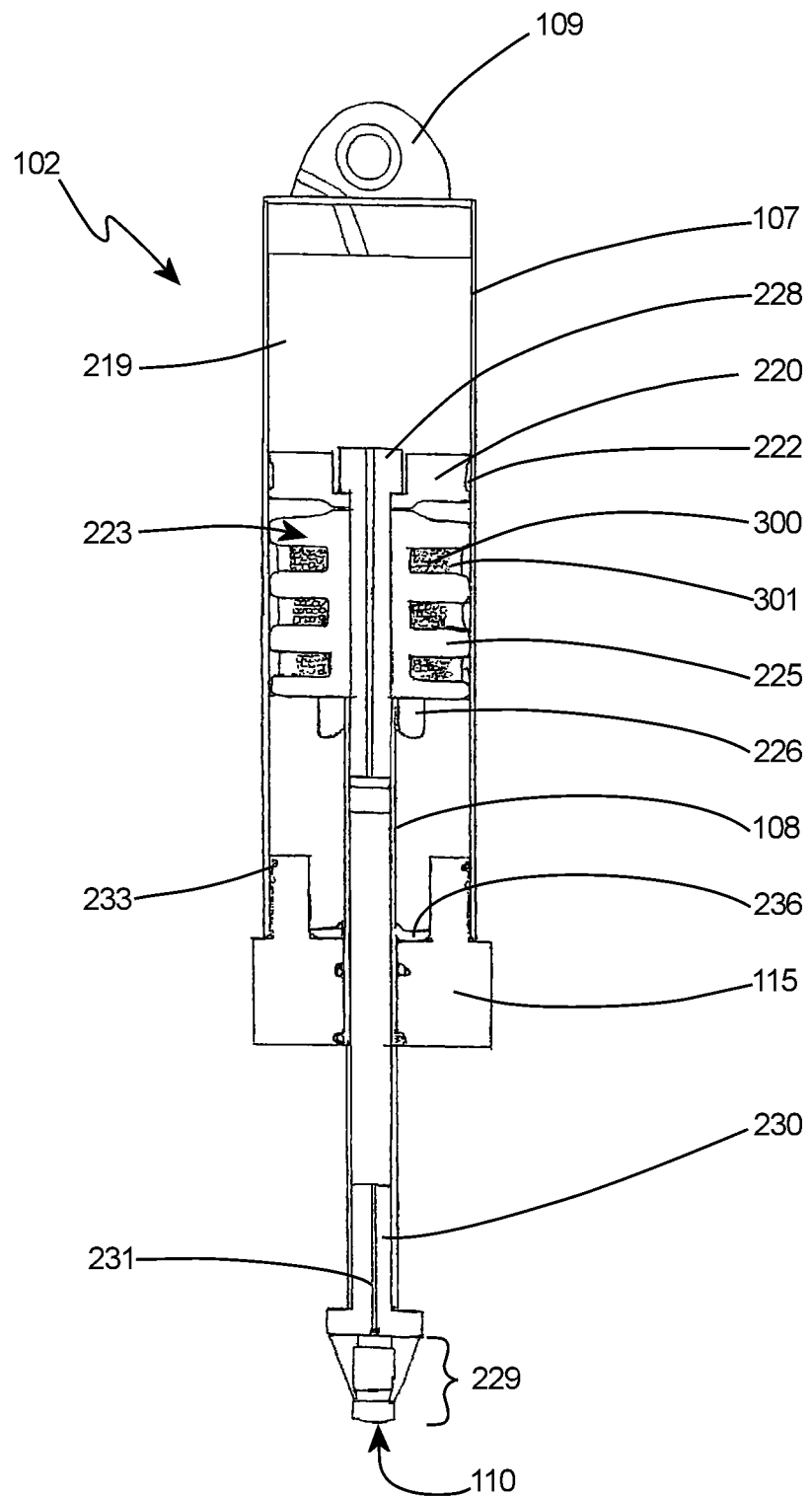
FIG. 3 is a cross-sectional view of an exemplary embodiment of the magnetorheological damper wherein the damper piston is compressed.

The MR damper valve 223 is a generally cylindrical body having a plurality of annular grooves 224 provided on the outer circumference. The annular grooves 224 are spaced apart forming ribs 225 between adjacent annular grooves 224. The annular grooves 224 and ribs 225 correspond to the recesses 216 and ribs 217 of the reservoir electromagnet 212. As with the reservoir electromagnet 212, the ribs 225 on the MR damper valve 223 have radiused edges as shown in FIGS. 2-4. Alternatively, the ribs 225 may be squared as shown in FIG. 9. In yet another exemplary embodiment of the MR damper valve 223, the ribs 225 may be tapered (see FIG. 8).

Turning back to FIG. 2, a rebound stop 226 is positioned below the base of the MR damper valve 223. The rebound stop 226 prevents damage to the MR damper valve 223 should the damper rod 108 extend to the point where the MR damper valve 223 nearly contacts the damper gland 115. According to one exemplary embodiment, the MR damper valve 223 is made of steel. In another exemplary embodiment, the MR damper valve 223 is made from heat-treated steel. As those skilled in the art will appreciate, the MR damper valve 223 may be made from any material having direct current magnetic properties.

The annular grooves 224 on the MR damper valve 223 are sized to allow for a wire (not shown) to be wound within each annular recess 224 to form a coil winding (not shown) or a electromagnet. The wire and coil windings are not shown in FIG. 2 for purposes of clarity in the drawings, but the wire and coil windings 300 are illustrated in FIG. 3. The coil windings (not shown) of each individual annular recess 224 are wound in opposite directions so that the magnetic field generated by each coil winding (not shown) passes through the fluid gap, into the damper housing, back into the fluid gap, and into an adjacent magnetic pole. Accordingly, as the MR fluid moves through the openings 221 on the piston end 220 and past the MR damper valve 223, an electrical current may be passed through the wire to create a magnetic field. The magnetic field alters the shear strength of the MR fluid passing between the ribs 225 and the damper housing 107. As discussed previously with respect to the reservoir electromagnet 212, gap plugs 227 protect the wire (not shown) as it spans between adjacent annular grooves 224. Alternatively, as shown in FIG. 9, the ribs 225 of the MR damper valve 223 may be provided with through-holes 900, 901 that allow the wire (not shown) to span adjacent annular grooves.

Figure 11:
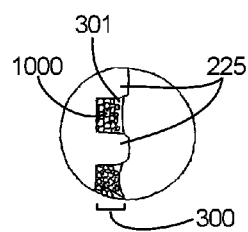
FIG. 11 is an enlarged cross-sectional view of FIG. 10 taken along line A-A.

Turning to FIGS. 3, 4, and 11, the coil windings 300 are also protected by a coating 301. The coating 301 can be a polymer or an epoxy coating. As those skilled in the art will appreciate, other polymers coatings known or developed in the art may be utilized to encapsulate the coil windings 300. The number of coil windings 300 and the thickness of the coating 301 are sized to promote laminar flow of the MR fluid along the outer surface of the MR damper valve 223. That is, the coated coil windings 300 are to have substantially the same circumference as the MR damper valve 223.

As shown in FIGS. 2-4, a piston bolt 228 secures the piston end 220 and the MR damper valve 223 to the damper rod 108. In the embodiments depicted in FIGS. 2-4, the piston bolt 228 is secured to the damper rod 108 via threads on the outer diameter of the piston bolt 228 and threads on the inner diameter of the damper rod 108. In another exemplary embodiment, the damper rod 108 may be secured to the piston bolt 228 by a friction fit. As shown in FIGS. 2-4, the damper rod 108 is a generally cylindrical member having an inner bore. Wires from the coil windings 300 are threaded through the damper rod 108 and exit the rod end 110 to a power supply (not shown).

In one embodiment, a thermocouple or a thermistor (not shown) is disposed on the end of the piston bolt 228 or the piston end 220 so that the temperature of the MR fluid actually present in the chamber may be determined. Since temperature is one condition that dictates the operation of the electromagnets in the system since the properties of MR fluid change with temperature, the presence of the temperature sensor within the system itself ensures accuracy and precision in the operation of the system.

Figure 7:
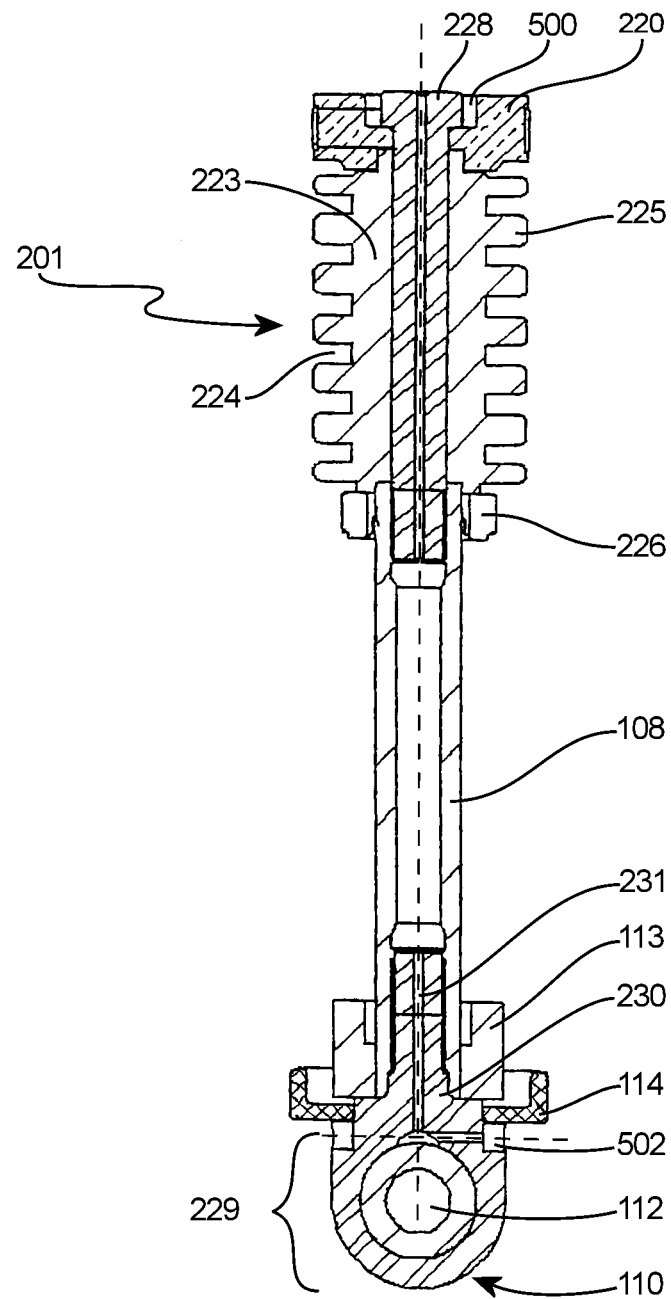
FIG. 7 is a cross-sectional side of FIG. 5.

The rod end 110 is coupled to the damper rod 108 by a press-fit, screw-fit, or friction-fit relation. As shown in FIGS. 5-7, the rod end 110 has a generally circular head 229 integral with a cylindrical body 230 having a main bore 231 extending along the longitudinal axis of the cylindrical body 230. A through-hole 502 perpendicular to the main bore 231 of the rod end 110 permits the wires (not shown) from the coil windings 300 to exit the MR damper 102. The circular head 229 of the rod end 110 is provided with an opening 112 that is adapted to couple to the rod end 110 to the suspension (not shown) of the vehicle.

Turning back to FIGS. 2-3, at the other end of the damper housing 107, a damper gland 115 seals the damper housing 107. According to an exemplary embodiment depicted in FIG. 2, the damper gland 115 is screwed onto the damper housing 107 and sealed by at least one gasket 233. The damper gland 115 is provided with a centered opening 234 for the damper rod 108 to move through. A generally circular recess 235 or counterbore is provided on the internal face of the damper gland 115. Within the recess 235 is placed an internal wiper 236.

Figure 12:
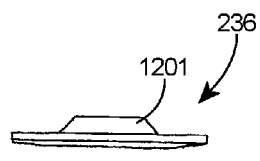
FIG. 12 is a side view of one embodiment of the internal wiper.
Figure 13:
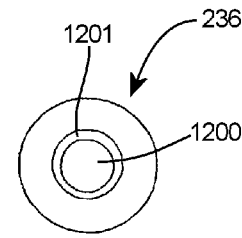
FIG. 13 is a top view of FIG. 12.
Figure 14:
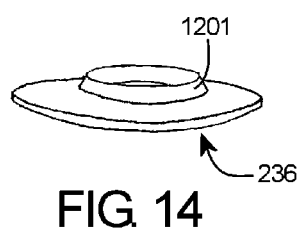
FIG. 14 is a perspective view of FIG. 12.

With reference to FIGS. 12 and 13, the internal wiper 236 is a generally flat annular disc having a centered opening 1200 that is sized to fit with very tight tolerance on the outer surface of the damper rod 108. The opening 1200 of the internal wiper 236 is characterized by a beveled edge 1201 as shown in FIG. 12. As also shown in FIG. 12, the side of the wiper 236 opposite the beveled edge also has a slight taper. As those skilled in the art will appreciate, the internal wiper 236 may be made from a plurality of materials such as, but not limited to, brass, steel, titanium, aluminum, metallic alloys, and composite materials.

As a result of the tight tolerance between the centered opening 1200 and the outer surface of the damper rod 108, the internal wiper 236 functions to remove or "wipe" MR fluid from the damper rod 108 as the damper rod 108 moves in a direction away from the damper housing 107. In other words, as the damper rod 108 moves past the internal wiper 236, the MR fluid that may have adhered to damper rod 108 is wiped away from the damper rod 108 and thereby prevented from inducing excessive wear on the seal due to the momentum and abrasiveness of the MR fluid.

Turning to another exemplary embodiment, reference is now made to FIG. 4. The embodiment depicted in FIG. 4 is similar to the MR damper system 100 that is illustrated in FIG. 2 with the exception that the reservoir 101 and the MR damper 102 are integral in one cylindrical structure 400. In this regard, the reservoir 101 and the MR damper 102 are in communication by a through-hole 401 positioned on the reservoir gland 402. The reservoir 101 comprises a reservoir electromagnet 212 secured to the reservoir gland 402 by a bolt 214 and includes a reservoir piston 206 that sealingly engages the cylindrical walls by gaskets 207, 208.

The reservoir piston 206 divides the reservoir 101 into two areas 205, 215. In the first area 205 of the reservoir 101, an inert gas such as, but not limited to, nitrogen, may be introduced therein by a valve 403 positioned on the cylinder end 109. The second area 215 of the reservoir 101 is sized to hold a volume of MR fluid that may be displaced from the internal chamber 219 of the MR damper 102 as a result of movement of the piston 201.

The internal chamber 219 of the MR damper 113 is defined by the cylindrical wall 400, the reservoir damper gland 402, and the MR damper gland 115. Within the internal chamber 219 is a MR fluid and a MR damper piston 201. The damper piston 201 comprises a piston end 220 coupled to a MR damper valve 223 and a damper rod 108. The MR damper valve 223 comprises a plurality of coil windings 300 which can generate a magnetic field when a current is passed through the coil windings 300. When a magnetic field is generated, the shear strength of the MR fluid that flows over the MR damper valve 223 increases. Consequently, the force required to move the damper piston 201 through the MR fluid also increases.

As shown in FIG. 3, a rebound stop 226 is positioned below the MR damper valve 223 to prevent damage to the MR damper valve 223 or the damper gland 115 in the event that the damper rod 108 is fully extended. An internal wiper 236 is also positioned within the damper gland 115, and the internal wiper 236 functions to remove MR fluid that may "adhere" to the damper rod 108. The damper rod 108 also includes a rod end 110 and may optionally include a bump stop 113 and a bump stop cup 114.

MR Damper System Control and Operation

Figure 15:
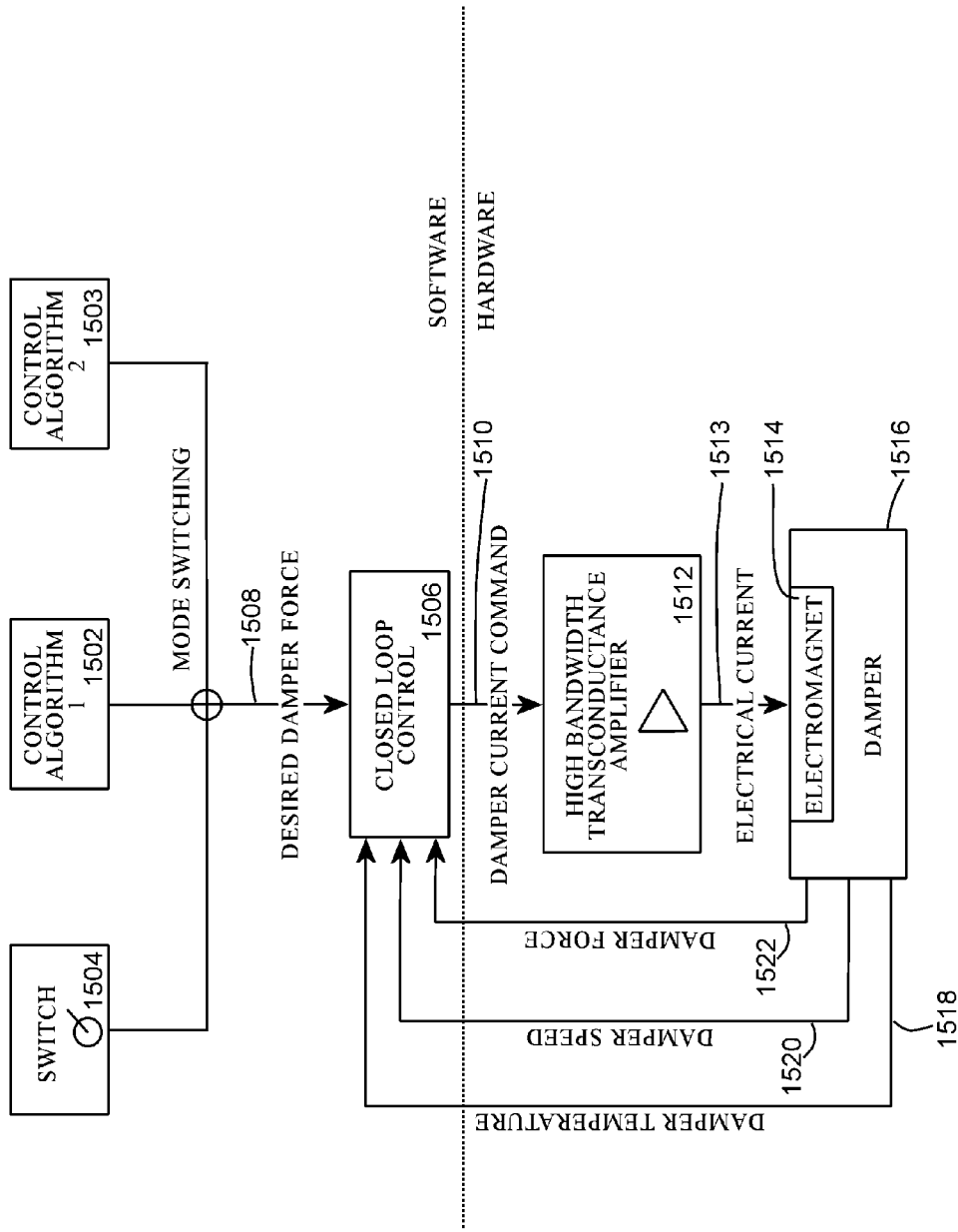
FIG. 15 is block diagram of a control system in accordance with one preferred embodiment of the present invention.
Figure 16:
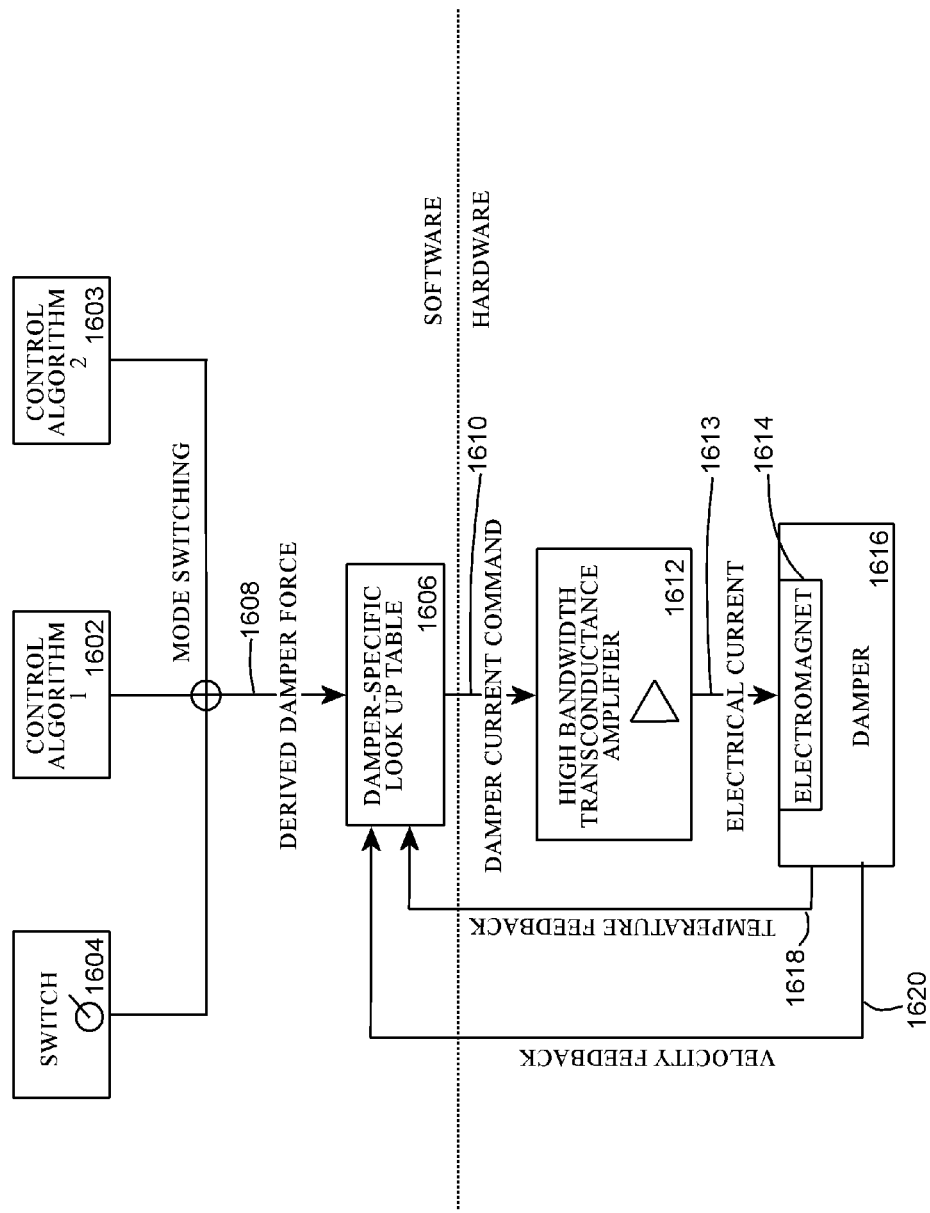
FIG. 16 is a block diagram of a control system in accordance with a second preferred embodiment of the present invention.

Turning next to the control and operation of a MR damper system in accordance with the present invention, reference is made to FIGS. 15 and 16 wherein two alternative approaches to system control are depicted. The first, FIG. 15, is based on a closed loop control approach. The second, FIG. 16, is based on an open loop control approach. In this regard, the control scheme depicted in these figures is directed to control of a MR damper valve 223 in a generic sense. That is, these figures do not explicitly identify a control scheme for simultaneous control of a MR damper valve 223 and a reservoir electromagnet 212 as such structure is described in exemplary embodiments described above. A system for such simultaneous control is more affirmatively identified in FIG. 17, which will be discussed in greater detail below.

With reference first to FIG. 15, the closed loop control system offers a choice of control algorithms 1502, 1503 to the user which are selected by activation of a switch 1504. Switch 1504 can be a mechanical switch, adjusted by a vehicle occupant or operator. Alternatively, the switch can take the form of a subroutine within the control system that serves to evaluate the operating conditions of the structure being dampened and then serves to automatically select the most appropriate control algorithm 1502, 1503 for those conditions. The selection of an algorithm shall depend on the desire of the user or on the programming of a selection subroutine of the control system. For example, one algorithm may be particularly well suited for a particularly treacherous off-road terrain. Another algorithm may be better suited for a relatively flat and smooth terrain. Alternatively, one algorithm may be designed to ensure the vehicle maintain certain ride characteristics no matter what the nature of the terrain. In one exemplary embodiment, the user or software may choose a control algorithm known to those in the art as a "skyhook" algorithm.

The choice of the algorithm will then dictate to the system the desired damper force 1508 depending on various inputs used in the algorithm that are received in the closed loop control 1506. The inputs to the closed control loop include the damper system temperature 1518, i.e., the temperature of the MR fluid, the damper speed 1520, i.e., the speed with which the damper rod 108 is actuated upon encountering an obstacle or hole, and the actual damper force 1522. The methods by which each of these inputs is obtained will be appreciated as being known to those of ordinary skill in the art. For example, the temperature of the MR fluid can be obtained with a thermocouple.

Based on the inputs 1518, 1520, 1522 received by the closed loop control 1506 and governed by the selected algorithm, the control 1506 generates a damper current command 1510 (so long as the inputs indicate a signal is needed) and delivers it to a high bandwidth transconductance amplifier 1512 (discussed in greater detail below). The amplifier 1512 then amplifies the signal into an electrical current 1513 that is applied to the electromagnet (the coils) 1514 of the damper system 1516. This causes the shear strength of the MR fluid to change in direct proportion to the magnitude of the electrical current 1513 and thus dampens the movement of the MR damper piston 201 with the system 1516 in a manner that is directly responsive to the actual inputs 1518, 1520, 1522. Like all closed loop systems, this system automatically and continually adjusts the electrical current 1513 applied to the coils until the actual damper force 1522 matches the desired damper force 1508 of the algorithm.

Turning then to FIG. 16, the open loop control system in accordance with the present invention is now described. In this regard, as with the closed loop system, the user chooses a desired algorithm, 1602, 1603 according to activation of an algorithm switch 1604. The selection of an algorithm is based on the desire of the user as discussed above.

As with the closed loop system, the choice of the algorithm will then dictate to the damper specific lookup table 1606 the desired damper force 1608 depending on various inputs used in the algorithm. A derived damper current command 1610 for any given set of parameters is identified from the "Damper-Specific Look Up Table" 1606. This look up table 1606 contains data that is based on the characteristics of an actual damper system that conforms to the system that is being controlled. In other words, the look up table is created based on performance data that is obtained from an actual damper system having the same design as the damper unit being controlled by the look up table. This "actual" data serves to generally "characterize" the operation of any damper system that is similarly (or identically) designed and therefore this data can be used as general control data for all such damper systems.

In operation, the damper-specific look up table receives a velocity feedback input 1620 and a temperature feedback input 1618 (i.e., temperature of the MR fluid) in addition to the desired damper force as determined by the algorithm. Based on the values of each of these inputs, the system will refer to a look up table that contains the appropriate damper current command so that the damper matches the desired damper force based on the characterized actual damper. In other words, this damper current command is the value that was deemed most appropriate for the same given inputs on a prototypical damper system that was used to generate the look up table. The damper current command 1610 is then communicated to the high bandwidth transconductance amplifier 1612 (discussed in greater detail below) which amplifies the signal into an electrical current 1613. The current 1613 is then applied to the electromagnet (i.e., the coils) 1614 of the damper system 1616 to thus change the shear strength of the MR fluid for the purposes discussed above.

Some having ordinary skill in the art perhaps may take the position that the closed loop system discussed with reference to FIG. 15 provides slightly more accurate damping control than the open loop system discussed with reference to FIG. 16. This may be based on the ability of a closed loop system to constantly monitor the force feedback data from the damper and to thereby finely adjust the current command to the MR damper system 100. However, closed loop systems of this type typically require complex or at least expensive feedback devices (e.g., load cells, etc.) and more powerful computing devices, i.e. a faster microprocessor, that are not otherwise necessary in an open loop system. Thus for the sake of simplicity and cost, there is perhaps at least an economic incentive to control the MR damper 102 using an open loop system (i.e., use a look up table) as referenced in FIG. 16. It will be appreciated by those of ordinary skill in the art that either type of system is contemplated as being part of the present invention.

As a final point regarding the control systems of FIGS. 15 and 16, it is noted that both systems utilize a high bandwidth transconductance amplifier 1512, 1612. Given the advantages this amplifier adds to the control system, a brief discussion regarding its operation is useful.

In this regard, it will be understood that typically a damper current control command is a low level signal (preferably a voltage signal but it can also be serial digital, parallel digital, fiber optic or other known means of transmitting data) that must be converted and amplified into a current output of sufficient magnitude to drive the MR system electromagnet windings 1514, 1614. It will also be appreciated that is very desirable in the context of the present invention to exercise high bandwidth control of the MR damper valve 223 and the reservoir electromagnet 212 so as to maximize the dynamic performance of the system. However, the windings 218, 300 on each of these components have significant electrical inductance by virtue of their need to generate large damping forces, such large damping forces being achieved by magnetizing the MR fluid in the gaps between the ribs 217, 225 and housing 103, 107. This high inductance makes generation of a current output of sufficient quality to achieve high bandwidth from a low level signal control virtually impossible without a current amplifier of some type.

It is to address these competing interests that the high bandwidth transconductance amplifier in accordance with the present invention is used. In this regard, the present invention contemplates the use of a hysteretic switchmode transconductance amplifier, i.e., a transconductance amplifier that utilizes a hysteretic switching technique as opposed to fixed frequency switching. Such a hysteretic switching technique ties the switching frequency and duty cycle of the amplifier to the proportion of error between the desired and measured current through the coil windings 218, 300 as opposed to a set fixed frequency. In addition, this type of amplifier incorporates a DC/DC converter that increases the voltage that can be supplied to the damper from, say 12 VDC to 60 VDC to further improve transient response of the system. However, operation of the high bandwidth transconductance amplifier is still possible without such a supplemental DC/DC converter.

Through the use of a high voltage input and the hysteretic switching technique, the problems otherwise encountered due to the high inductance windings to inhibit high bandwidth control are substantially reduced or even eliminated. For example, the use of a high voltage input gives the amplifier greater capability to generate larger magnitudes of current flowing through the coils 218, 300, and to do so at an increased speed, over amplifiers using a low voltage input.

The amplifier, known by those familiar with the art as a hysteretic current mode converter, oscillates at a variable frequency between conduction and regeneration. It is the ratio of time spent in conduction to regeneration that defines how much current flows through the coil windings. If more coil current is desired by the control system, the amplifier output stage spends a greater proportion of its time in the conduction phase. If less coil current is desired by the control system, the amplifier output stage spends a greater proportion of its time in the regeneration phase. Because of the large inherent inductance in the coil winding, the amplifier behaves as a synchronous flyback converter, generating voltage potentials greater than the supply voltage. In this case, energy stored in the coil winding inductor may be increased in voltage by the amplifier, and returned to the amplifier power supply, presumably to be used to re-energize the coil winding at a later time.

This allows any energy stored in the winding to be recovered rather than dissipated and facilitates very fast reductions in coil current. Finally, the hysteretic switching technique can approach zero (i.e., it can momentarily apply direct current to the coil winding) when the error between the desired and actual current is large. As a result, heat generation within the semiconductor switches is minimized when the currents involved are large. Each of these advantages is extremely conducive to the amplifier achieving the high system bandwidth that is desired.

As a last statement regarding the amplifier, it is noted that in a preferred embodiment, the hysteretic switchmode transconductance amplifier is implemented using an electrical circuit designed with a commercially available HIP4080A integrated circuit from Intersil. Of course, other electronic designs that support hysteretic control are also known to those of skill in the art.

Figure 17:
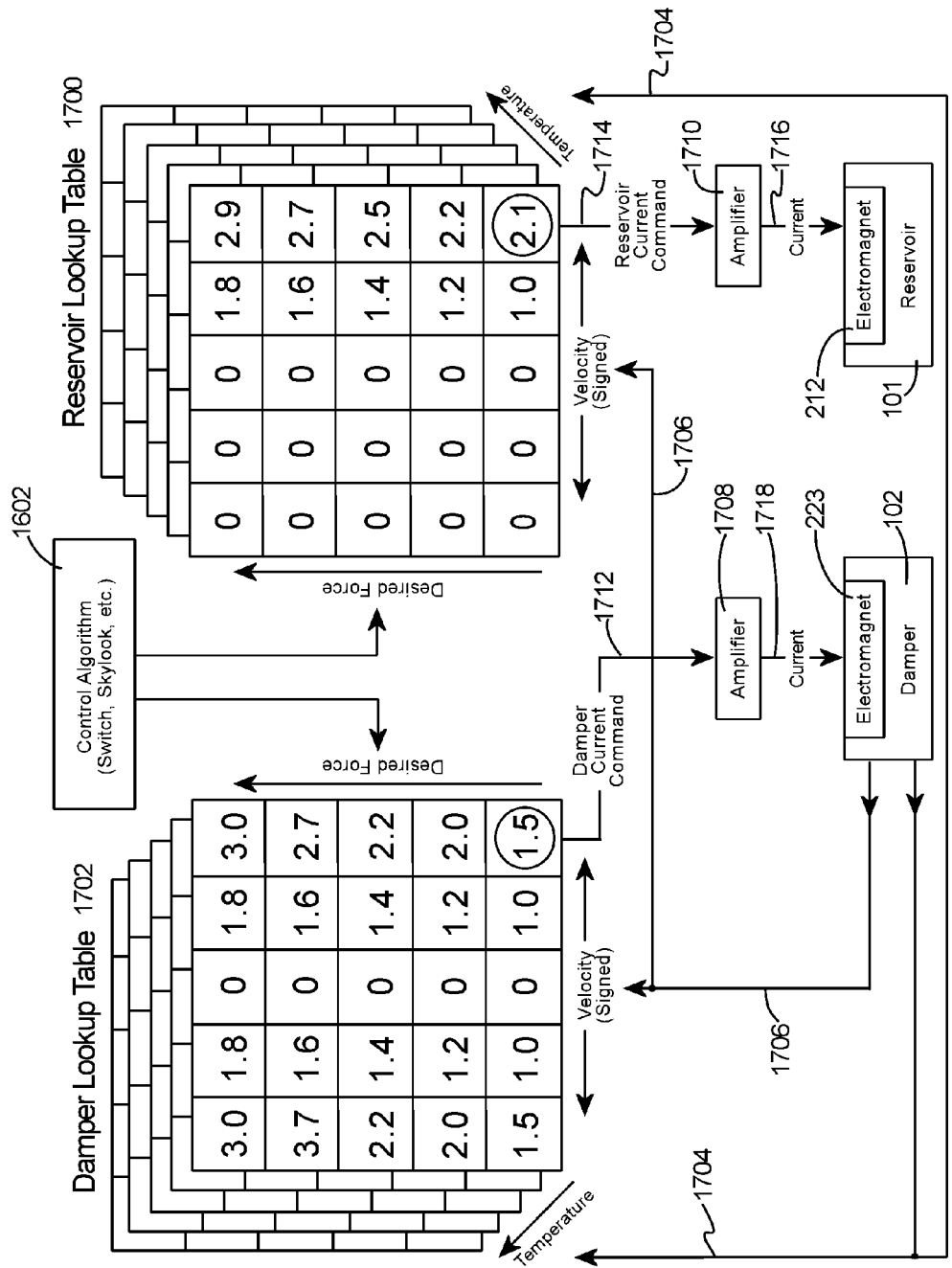
FIG. 17 is a block diagram of a control system for use in controlling the damper system set forth in FIG. 2 in accordance with a preferred embodiment of the present invention.

As a final discussion regarding a control system in accordance with the present invention, reference is next made to FIG. 17 which graphically depicts a system for controlling the damper system 100 of FIG. 2. In this regard, a dedicated hysteretic transconductance amplifier 1708, 1710 is provided for the MR damper 102 and the MR reservoir 101. It is also seen that the MR damper 102 includes sensors providing MR fluid temperature feedback 1704 and velocity feedback 1706, i.e., feedback on the velocity of the suspension system as it encounters an obstacle.

Within the controller (not shown), there is stored the control algorithm 1602 (or choice of algorithms as discussed above) along with two sets of lookup tables, namely a damper set of lookup tables 1702 and a reservoir set of lookup tables 1700. Each lookup table contains current command data that is organized according to both velocity values for the suspension system and desired forces for each velocity value. In other words, for each value of velocity and for each value of a desired force, there is a value corresponding to current demand.

The control algorithm 1602 determines the value of the desired force for a measured velocity which thereby leads to the controller issuing the necessary current command. In the case of the damper set of lookup tables 1702, the controller issues a damper current command 1712 and in the case of the reservoir set of lookup tables 1700, the controller issues a reservoir current command 1714. It should be noted in this regard, however, that the only time a reservoir current command 1714 is issued is when the velocity is a positive value, i.e., when the damper rod 108 is being pushed into the damper housing 107. There is no reservoir current command value when the velocity value is negative, that is, when the damper rod 108 is extending away from the damper housing 107. The reasons for this will become more apparent in the description of the operation of the damper system 100 set forth below. Furthermore in this regard, although a preferred embodiment described herein contemplates a damping system that uses a reservoir valve, the principles of the control system described herein are equally applicable to a damping system that does not use a reservoir valve. In such an instance, for example, there would be lookup tables for the damping system alone.

In operation, the controller monitors the velocity of the suspension system and the temperature of the MR fluid within the damper system. The measured temperature will dictate which of the damper set of lookup tables 1702 and which of the reservoir lookup tables 1700 to utilize. The selected algorithm will then identify the desired damper force, which is then translated by the look up table to an appropriate current command 1712 and the appropriate reservoir current command 1714 (assuming the velocity value is positive) from the lookup tables 1700, 1702, and will then send each of these respective signals to the amplifier 1708, 1710 dedicated to the MR damper 102 and the MR reservoir 101, respectively. Each amplifier 1708, 1710 will then convert the signals to current and energize the windings (coils) 300, 218 of its respective electromagnet 223, 212. The energization of these coils 300, 218 will then lead to the enhanced damping effect of the MR damping system 100 of the present invention for the encountered force.

In view of the foregoing, it is now useful to provide an example of the actual operation of a damping system 100 in accordance with the present invention. Although this description is directed towards a damper 102 used on a vehicle 1800, it will be readily apparent to those in the art that the present invention has a wide variety of applications. In this regard, reference is made to FIG. 2 and FIG. 18 where the structure of FIG. 2 is shown mounted on an actual vehicle 1800.

In this example, it is assumed that the control algorithm is one that mimics a traditional passive damper, i.e., it mimics a device where the damping force is proportional to the differential speed between the damper rod 108 and the damper housing 107. Of course, there are algorithms that offer far more sophisticated control than the system just described, however, for the purposes of this example a simple algorithm shall suffice.

Figure 18:
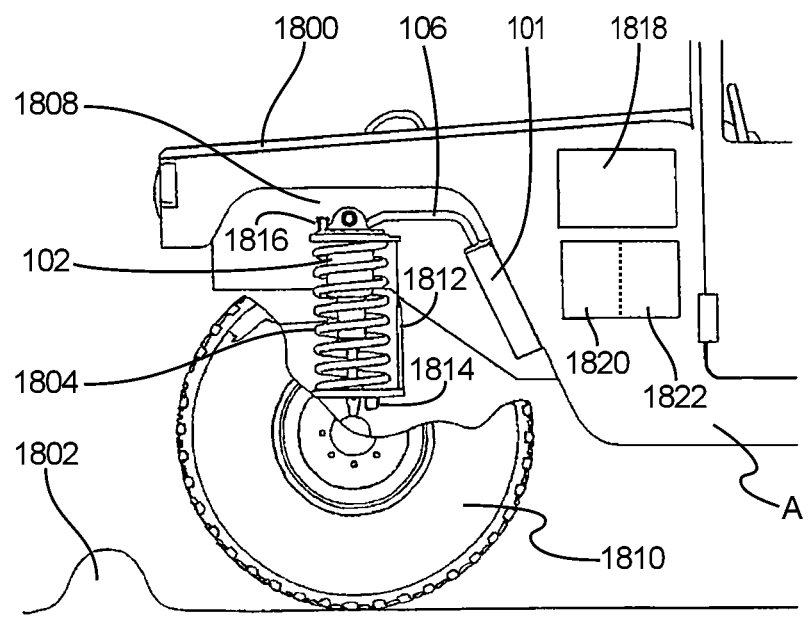
FIG. 18 is a cross-sectional view of the use of an embodiment of the present invention in a vehicle.

Referring to FIG. 18, a vehicle 1800 is shown having mounted thereon the MR damper 102 and reservoir 101. Surrounding the MR damper is a spring 1804 to provide a spring/damper pair that serves to introduce compliance between the vehicle chassis 1808 and the wheel/tire 1810. There are also sensors mounted on the vehicle, namely, an accelerometer 1814 for measuring wheel/tire acceleration, accelerometer 1816 for measuring the sprung mass acceleration, and position sensor 1812 for measuring suspension position. Finally, the vehicle 1800 also supports a microprocessor-based software controller 1818 and the previously described hysteretic transconductance amplifier 1820 along with its DC/DC low to high voltage converter 1822. It will be understood that the sensors and the amplifier and other electronics are all connected to the microprocessor.

At all times the controller 1818 monitors the sensors. In this example, the controller 1818 computes the velocity of the suspension by differentiating the signal received from the position sensor 1812 and bases its damper force signal thereon.

As the wheel/tire 1810 of the vehicle 1800 encounters an obstacle 1802, the wheel/tire 1810 is forced to move upwardly thereby causing the spring/damper pair to compress rapidly. The controller 1818 differentiates the signal from the position sensor 1812 to arrive at a suspension velocity. The control algorithm then reacts to the suspension velocity signal by referring to the lookup table (See FIG. 17) for both the MR damper 102 and the MR reservoir 101 and selecting the damper current command 1713 and reservoir current command 1714 that corresponds to the MR fluid temperature and the desired reactive force for that velocity signal under that algorithm. The amplifier 1820 draws power from the DC/DC converter 1822 and quickly energizes the coils 300 of the MR damper valve 223 and the coils 218 of the reservoir electromagnet 212 to the current level dictated by the corresponding damper current command 1713 and reservoir current command 1714, respectively.

From a mechanical point of view, the damper rod 108 is at this time being driven upwardly into the damper housing 107 and is thereby causing MR fluid to flow over the MR damper valve 223. This flow of MR fluid causes a differential pressure across the damper valve 223 which itself opposes the upward movement of the damper rod 108. However, additional resistance is introduced due to the increased shear strength of the MR fluid resulting from the magnetic flux now found in the coils 300.

In the event the controller commands that more current be supplied to the coils 300 of the MR damper valve 223, the magnetic field between the MR damper valve 223 and the wall of the damper housing 107 increases. This increase of course in turn increases the shear strength of the MR fluid which manifests itself as yet greater increased damping force opposing the direction of travel of the damper rod 108.

However, further explanation is still required to illuminate the function and utility of exciting the coils 218 in the reservoir electromagnet 212. In this regard, it is useful to discuss the flow of fluid between the MR damper 102 and the reservoir 101 and the fluid dynamics that can arise in certain circumstances.

As the damper rod 108 moves into the damper housing 107, the volume in the damper housing 107 available for holding the MR fluid is decreased exactly by the volume that the damper rod 108 displaces in the damper housing 107. Since MR fluid is essentially incompressible, it is forced to travel from the damper housing 107 to the reservoir 101 through the conduit 106. Once in the reservoir 101, the MR fluid flows over the reservoir electromagnet 212 into the internal space 215 of the reservoir 101. As flow continues and pressure builds within the reservoir, the reservoir piston 206 will be displaced by a volume equal to the volume of the damper rod 108 that enters the damper housing 107. The gas, e.g., nitrogen, present in the space 19 behind the reservoir piston 206 then, of course, compresses and serves to enhance the dampening effect of the system.

In instances where the velocity of the damper rod 108 into the damper housing 107 are especially dramatic and thus result in large controller demands on the coil 300 of the MR damper 102, there is a need to prevent the risk of cavitation, i.e., the creation of a low pressure vapor bubble, of the MR fluid in the low pressure side of the MR damper valve 223 (referred to previously). That is, in order to create the damping forces necessary to counteract a dramatic velocity change in the suspension, high current must be passed through the coils 300 of the MR damper valve 223. This high current obviously dramatically increases the shear strength of the MR fluid. As a result, a corresponding dramatic increase in the pressure differential across the MR damper valve 223 is created. This leads to a very high pressure being present on the side of the MR damper valve 223 furthest from the damper rod 108 and potentially a very low pressure being present on the side of the MR damper valve 223 nearest the damper rod 108.

When this low pressure on the side of the MR damper valve 223 nearest the damper rod 108 approaches the vapor pressure of the MR fluid, there is the possibility that a vapor bubble is created. When such a bubble is created, the damping system no longer can generate damping forces from the effect of differential pressure and instead of the reservoir receiving only that volume of fluid corresponding to the displaced volume of the damping rod 108, the entire volume of fluid swept by the MR damper valve 223 is urged into the reservoir 101. Clearly this is an unacceptable condition and it is primarily for this reason that the present invention contemplates the energization of coils 218 in the reservoir electromagnet 212.

It is known in the art that creating an increase in the pressure in the space 205 containing the compressible fluid, e.g., nitrogen, of the reservoir 101, serves to create an increased "precharge" pressure within the entire damping system 100, including in the space behind the MR damper valve 223 nearest the damper rod 108. With the existence of an increased pre-charge pressure in this area, the damping system 100 is able to endure greater differential pressure between opposing sides of the MR damper valve 223 without cavitation. However, increasing the pre-charge pressure in this manner also increases the parasitic spring rate of the system and generally limits the effectiveness and quality of the damping system.

Accordingly, the present invention utilizes the reservoir electromagnet 212 to increase the so called "pre-charge" pressure in the system but only in response to the detection of certain large damper force values that may otherwise induce cavitation. In all other respects, the pre-charge pressure will remain as determined by the pressure in the space 205 of the reservoir 101. In other words, when large damper force values are encountered, the control system energizes both the coils 300, 218 of the MR damper valve 223 and the reservoir electromagnet 212 (in the manner described with reference to FIG. 17), the former to create the differential forces necessary to respond to the velocity signal, the latter to increase the "pre-charge" of the damper system 100 and thereby prevent cavitation. In this fashion, the present invention has the capability to effectively and qualitatively dampen both "normal" and dramatic forces while also avoiding undesirable parasitic spring forces.

Fabrication

According to the teachings of the present invention, the MR damper valve 223 and the reservoir electromagnet 212 may be fabricated by various methods. Generally, the reservoir electromagnet 212 and the MR damper valve 223 are fabricated by similar methods but the description to these various fabrication methods will be directed to the MR damper valve 223. The MR damper valve 223 may be manufactured from steel or other magnetizable metals. Annular grooves 224 are then machined along the outer diameter of the MR damper valve 223. According to one exemplary method, the annular grooves 224 are tapered as shown in FIG. 8. According to one exemplary method, the edges of the annular grooves 224 may be radiused as shown in FIGS. 2-7. A lengthwise slot 501 traversing through the annular grooves 224 may then be machined into the MR damper valve 223 as shown in FIG. 5. After the MR damper valve 223 has been machined, the slot 501 can be deburred to prevent damage to the coil windings 300. According to one exemplary method, the MR damper valve 223 may be heat treated to soften the material and improve the magnetic properties of the MR damper valve 223.

According to one exemplary heat treating method of the present invention, the MR damper valve 223 is heat charged in a wet hydrogen atmosphere with a dew point of approximately 75° F. (24° C.) to a temperature of no more than 1740° F. (950° C.) for approximately two to approximately four hours. In another exemplary heat treating method of the present invention, the MR damper valve 223 may be heat charged in a in a wet hydrogen atmosphere with a dew point of approximately 75° F. (24° C.) to 1562° F. (850° C.). The MR damper valve 223 is then cooled at a rate of 180/306° F. (100/170° C.) per hour to 1000° F. (540° C.). Thereafter, the MR damper valve 223 may be cooled at any rate. In other exemplary methods, different atmospheres such as, but not limited to, pack anneal, vacuum, dry hydrogen, argon, forming gas (comprising hydrogen and nitrogen) may be used with a treating temperature in the 1350/2150° F. (730/1180° C.) range.

According to one exemplary method of the present invention, the MR damper valve 223 is placed in a jig fabricated for winding the coils 300. A length of wire 1000 is then wound around each annular groove 224 as shown in FIGS. 10-11. In one exemplary method, the wire 1000 is tightly wound approximately 40 to approximately 60 times in each annular groove 224. As those skilled in the art will appreciate, the number of windings may vary depending upon the desired magnetic field. Additionally, the coil windings 300 in each adjacent annular groove 224 is wound in alternate directions. For example, if a first coil winding 300 is wound in a clockwise direction, the adjacent coil winding 300 is wound in a counter-clockwise direction. In an alternate method of the present invention, the coil windings 300 may be wound in the same direction.

In yet another exemplary method, thin strips of fiberglass matting (not shown) may be used to wrap coil winding 300 in each annular groove 224 each coil segment. In another exemplary embodiment, gap plugs 227 may be inserted and secured within the lengthwise 501 between each coil winding 300 prior to casting the coil windings 300 in a protective coating 301. In order to maintain flexibility of the wires 1000 that exit the MR damper valve 223, silicon rubber (not shown) may be used to seal the cavities surrounding the wires. The end faces of the MR damper valve 223, the inner bore of the damper valve 223, and the ends of the wires 1000 can be waxed with mold release to prevent the coating 301 from adhering to these parts during the casting process.

Figure 19:
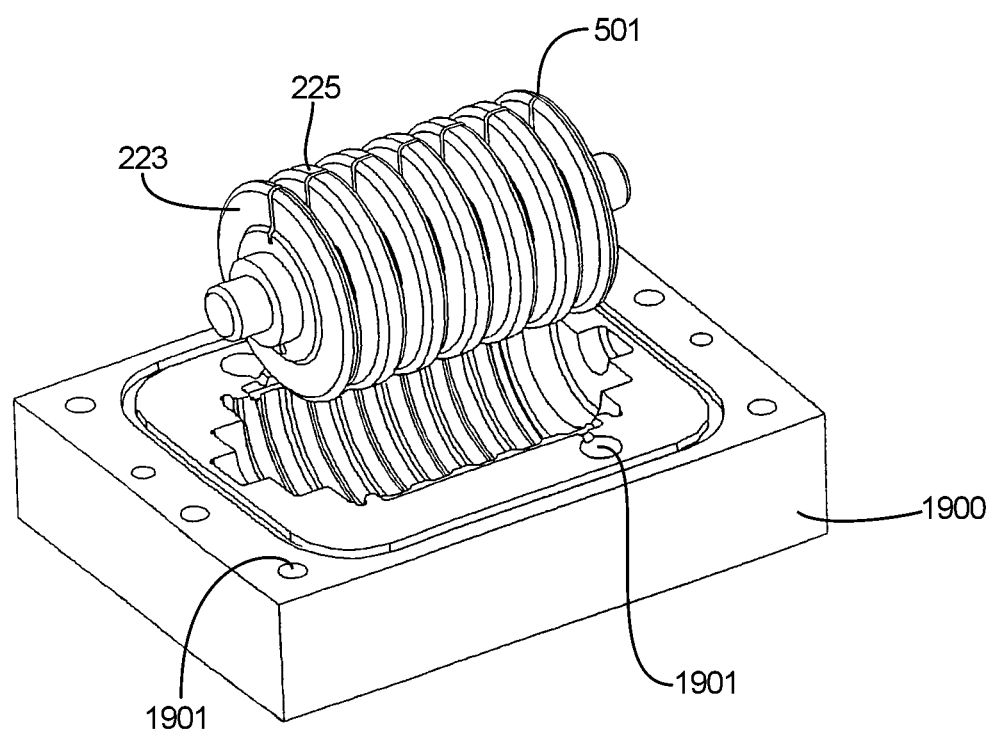
FIG. 19 is a perspective view of one-half of a mold used to polymer coat the damper valve of the present invention.

The MR damper valve 223 is then sealed within a mold 1900 (one half of the mold 1900 is shown in FIG. 19). The edges of the mold 1900 and the mold breaking holes 1901 are sealed with high temperature tape (not shown). Prior to the introduction of the epoxy into the mold, the damper valve-mold assembly may be heated to approximately 140° F. for approximately 2 hours. A vacuum is applied to the damper valve-mold assembly and the epoxy to remove as much air from the epoxy and the damper valve 223. The epoxy is then drawn through mold 1900 and a vacuum may then applied to further remove any air from the epoxy. The epoxy is then allowed to pre-cure for approximately 12 hours. Thereafter, the damper valve-mold assembly is heat cycled for approximately 26 hours and allowed to cool. The damper valve 223 is then removed from the mold 1900 and any unwanted epoxy that has adhered to the surfaces of the damper valve 223 can be removed. The completed damper valve 223 may be then coupled to a piston end 220 and a damper rod 108. Alternatively, the completed damper valve 223 may be coupled to a reservoir gland 104.

According to another exemplary method of the present invention, the polymer coating 301 can be applied to the coil windings 300 by a dip coating process. The preparation of the damper valve 223 is similar to the casting method with the exception to the process of coating the coil windings 300. After the damper valve 223 has been assembled, high temperature "flash breaker" tape (not shown) is applied over the coil windings 300 to protect the coil windings 300 during the masking process. According to one exemplary method, the flash breaker tape should be able to withstand at least 350° F.

After the coil windings 300 are taped, masking material is heated into a liquid state. According to one exemplary embodiment, McMaster Carr Supply masking material #7762T76 is used. As those skilled in the art will appreciate, any masking material known or developed in the art may be used in the dip coating process. According to one exemplary method, a portion of the damper valve 223 is dipped within the heated masking materials. In another exemplary method, the ends of the damper valve 223 are dipped within the heated masking materials. In yet another exemplary method, the whole damper valve 223 is dipped within the heated masking materials. In another exemplary method, the masked damper valve 223 may be subsequently heated to enhance the bonding between the damper valve 223 and the masking material.

Once the masking material has been applied to the damper valve 223, the "flash breaker" tape (not shown) is removed from the coil windings 300. The damper valve 223 is then hung within a dipping chamber (not shown). The dipping chamber is then sealed and vacuumed to remove as much air from dipping chamber. The vacuum is run until air bubbles cease to break out of the epoxy. Once the air has been removed from the chamber, the damper valve 223 is submerged within the epoxy for approximately one hour. The vacuum is then slowly reduced, and the damper valve 223 is removed from the epoxy when the epoxy begins to thicken. The epoxy on the damper valve 223 is allowed to pre-cure for approximately 12 hours at room temperature. The damper valve 223 then undergoes heat cycling to cure the epoxy and remove the masking material. Optionally, any unwanted epoxy may be cleaned from the damper valve 223. Once cleaned, the complete damper valve 223 may be coupled to a piston end 220 and a damper rod 108. Alternatively, the completed damper valve 223 may be coupled to a reservoir gland 104.

In closing, it is to be understood that the exemplary embodiments of the present invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the drawings and description are illustrative and not intended to be a limitation thereof.

What is claimed is:

1. A method of controlling a magnetorheological damper comprising:
   delivering a damper control command to an amplifier;
   controlling a frequency and a duty cycle of the amplifier based upon a proportion of error between a desired and a measured current through an electromagnet of the magnetorheological damper; and
   applying a damper current output to the electromagnet of the magnetorheological damper based upon said controlling.

2. The method of claim 1 wherein the step of delivering the damper control command to the amplifier comprises determining the damper control command based upon sensor feedback.

3. The method of claim 1 wherein the step of delivering the damper control command to the amplifier comprises determining the damper control command based upon damper velocity feedback.

4. The method of claim 1 wherein the step of delivering the damper control command to the amplifier comprises determining the damper control command based upon damper temperature feedback.

5. The method of claim 1 wherein the step of delivering the damper control command to the amplifier comprises determining the damper control command based upon damper force feedback.

6. The method of claim 1 wherein the step of delivering the damper control command to the amplifier comprises determining a vehicle operating condition.

7. The method of claim 1 wherein the step of delivering the damper control command to the amplifier comprises providing the damper control command to a transconductance amplifier.

8. The method of claim 1 wherein the step of applying the damper current output to the electromagnet of the magnetorheological damper based upon said controlling comprises generating a voltage potential greater than a supply voltage.

9. A method of controlling a magnetorheological damper comprising:
   receiving a damper control command at an amplifier;
   switching a frequency and a duty cycle of the amplifier based upon a proportion of error between a desired and a measured current through a coil winding of the magnetorheological damper; and
   providing a damper current output to an electromagnet of the magnetorheological damper based upon said switching.

10. The method of claim 9 wherein receiving the damper control command at the amplifier comprises determining the damper control command based upon sensor feedback.

11. The method of claim 9 wherein receiving the damper control command at the amplifier comprises determining the damper control command based upon damper velocity feedback.

12. The method of claim 9 wherein receiving the damper control command at the amplifier comprises determining the damper control command based upon damper temperature feedback.

13. The method of claim 9 wherein receiving the damper control command at the amplifier comprises determining a vehicle operating condition.

14. The method of claim 9 wherein receiving the damper control command at the amplifier comprises providing the damper control command to a transconductance amplifier.

15. The method of claim 9 wherein providing the damper current output to the electromagnet of the magnetorheological damper based upon said switching comprises generating a voltage potential greater than a supply voltage.

16. A method of controlling a magnetorheological damper comprising:
   amplifying a damper control command to a damper current output based upon a proportion of error between a desired and a measured current through a coil winding of the magnetorheological damper; and
   controlling an actuation of the magnetorheological damper based upon said damper current output.

17. The method of claim 16 further comprising determining the damper control command based upon a sensor feedback.

18. The method of claim 16 further comprising determining the damper control command based upon a vehicle operating condition.

19. The method of claim 16 wherein amplifying the damper control command to the damper current output based upon the proportion of error between the desired and the measured current through the coil winding of the magnetorheological damper comprises generating a voltage potential greater than a supply voltage.

20. The method of claim 16 wherein amplifying the damper control command to the damper current output based upon the proportion of error between the desired and the measured current through the coil winding of the magnetorheological damper comprises employing a transconductance amplifier.

* * * * *